United States Patent
Kurokawa et al.

(10) Patent No.: US 6,354,935 B1
(45) Date of Patent: Mar. 12, 2002

(54) MIX DOOR DRIVING MECHANISM FOR USE IN AUTOMOTIVE AIR CONDITIONER

(75) Inventors: Katsuhiro Kurokawa; Akihiro Tsurushima, both of Tochigi; Katsumi Uehara, Gunma; Noriyuki Kitahara; Toshio Komatsubara, both of Tochigi, all of (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/542,986

(22) Filed: Apr. 4, 2000

(30) Foreign Application Priority Data

Apr. 13, 1999 (JP) .......................................... 11-105638
Dec. 10, 1999 (JP) .......................................... 11-352338

(51) Int. Cl.[7] .................................................. B60H 3/00
(52) U.S. Cl. ...................................... 454/156; 74/89.18
(58) Field of Search .......................... 74/89.16, 89.17, 74/89.18, 461, 411, 437; 454/156, 160, 121

(56) References Cited

U.S. PATENT DOCUMENTS

| | | | | |
|---|---|---|---|---|
| 1,142,051 A | * | 6/1915 | O'Connor | 74/437 |
| 3,218,966 A | * | 11/1965 | Petit | 74/437 X |
| 3,918,313 A | * | 11/1975 | Montagnino | 74/437 X |
| 4,093,180 A | * | 6/1978 | Strabala | 74/437 X |
| 4,852,638 A | | 8/1989 | Hildebrand et al. | 165/42 |
| 5,372,065 A | | 12/1994 | Cuozzo et al. | 101/93 |
| 5,400,672 A | * | 3/1995 | Bunch | 74/461 X |
| 5,653,144 A | * | 8/1997 | Fenelon | 74/89.18 X |
| 5,701,949 A | | 12/1997 | Yamaguchi et al. | 165/42 |
| 5,924,324 A | * | 7/1999 | Kilker et al. | 74/89.18 |
| 6,095,007 A | * | 8/2000 | Brewington et al. | 74/89.18 X |
| 6,209,404 B1 | * | 3/2001 | Le | 74/89.18 |

FOREIGN PATENT DOCUMENTS

| | | |
|---|---|---|
| JP | 06-18018 | 8/1994 |
| JP | 06-18021 | 8/1994 |
| JP | 08-132852 | 5/1996 |
| JP | 08-282248 | 10/1996 |
| JP | 09-099725 | 4/1997 |
| JP | 09-123748 | 5/1997 |
| JP | 09-267620 | 10/1997 |
| JP | 10-297249 | 11/1998 |
| JP | 11-78482 | 3/1999 |
| JP | 11-099820 | 4/1999 |
| JP | 11-235921 | 8/1999 |
| JP | 11-254942 | 9/1999 |

* cited by examiner

*Primary Examiner*—Jerry Redman
(74) *Attorney, Agent, or Firm*—Foley & Lardner

(57) ABSTRACT

For driving a slide type air mix door, a driving mechanism is employed. The air mix door has a rack connected thereto. A gear unit is provided which includes an input gear, an output gear and a flexible structure through which the input gear and the output gear are integrally and coaxially connected. The output gear is operatively meshed with the rack. An electric actuator is provided for driving the gear unit through the input gear. Due to provision of the flexible structure, the electric actuator is prevented from being attached by an excessive load even when ill-matching occurs between de-energization of the electric actuator and arrival of the air mix door at a terminal stop position.

20 Claims, 8 Drawing Sheets

MIX DOOR DRIVING MECHANISM FOR USE IN AUTOMOTIVE AIR CONDITIONER

BACKGROUND OF THE INVENTION

1. Field of the Invention

The present invention relates in general to an automotive air conditioner and more particularly to a driving mechanism for driving a slide type air mix door installed in the air conditioner. More specifically, the present invention relates to the air mix door driving mechanisms of a type that employs a so-called rack-and-pinion arrangement.

2. Description of the Prior Art

In order to clarify the task of the present invention, some conventional automotive air conditioners will be briefly described before describing the detail of the present invention.

One of the conventional air conditioners is of a type which comprises an intake unit through which outside/inside air is introduced, a cooler unit with an evaporator through which the air is cooled and a heater unit with a heater core through which the air is heated. As is known, the evaporator is a device set in a refrigerant circulation cooling system, through which a low temperature-low pressure refrigerant from an expansion valve flows for cooling air passing therethrough, and the heater core is a device through which a warmed engine cooling water from an operating engine flows for heating air passing therethrough. The air intake unit, the cooler unit and the heater unit are aligned in a case and mounted on a front space of a passenger room of the vehicle. However, due to the aligned arrangement of these three units, the air conditioners of this type tend to have a longer and bulky construction and thus they are not suitable for small-sized motor vehicles.

In view of the above, various compact air conditioners have been proposed and put into practical use for such small-sized motor vehicles. One of the compact type air conditioners has such a construction that the evaporator and the heater core are stood and arranged closely in a case and aligned longitudinally in a motor vehicle. For obtaining much compact construction, a measure has been proposed wherein the cooler and heater units are integrated, by which the evaporator and heater core can be positioned much closer to each other.

In operation, through the intake unit arranged at one side of the case, air is led to the evaporator to be cooled and then distributed, by means of an air mix door, to upper and/or lower air flow passages, the lower air passage having the heater core installed therein. The air mix door is of a slide door type that slides up and down in front of mouth portions of the upper and lower air flow passages. Due to usage of this slide type door, the distance between the evaporator and the heater core can be shortened. The cooled air directed to the lower air passage is heated by the heater core and led to an air mix chamber where it is mixed with the cooled air that has passed through the upper air passage. Thus, the temperature of the air mixed in the air mix chamber depends on the work position of the air mix door. The mixed air thus having a certain temperature is then distributed to various portions of a passenger room through various air blowing openings formed in the case. Usually, mode doors are provided to the air blowing openings for providing the air conditioner with a plurality of air distribution modes.

For moving the slide type air mix door in the above-mentioned manner, a driving mechanism is employed which generally comprises two racks which are provided on lateral sides of the air mix door, two gears which are rotatably held by the air conditioner case and meshed with the racks respectively and an electric actuator which drives the gears. Thus, when the electric actuator is energized for a given time, the gears are rotated by certain angles and thus the air mix door is moved to a desired work position.

However, the above-mentioned driving mechanism has the following drawback.

That is, due to the nature of the electric actuator, the output shaft of the same inevitably has a dimensional deviation of about ±2° in operation angle. While, usually the driving mechanism has no means for compensating for such dimensional deviation. Thus, due to such dimensional deviation, it tends to occur that even when the air mix door has come to a terminal stop position, energization of the electric actuator still continues, that is to say, stopping of the electric actuator is not timed with arrival of the air mix door at the stop position. In this case, the electric actuator is attacked by an excessive load inevitably, and thus the life of the electric actuator and thus that of the driving mechanism becomes shortened. In order to solve this drawback, a load sensor that turns off the electric actuator upon sensing the excessive load may be employed. However, in this case, cost performance is sacrificed.

SUMMARY OF THE INVENTION

It is therefore an object of the present invention to provide an air mix door driving mechanism for use in an automotive air conditioner, which is free of the above-mentioned drawback.

That is, an object of the present invention is to provide an air mix door driving mechanism for use in an automotive air conditioner, which can protect the electric actuator even when stopping of the electric actuator is not exactly timed with arrival of the air mix door at a stop position.

More specifically, the object of the present invention to provide an air mix door driving mechanism for use in an automotive air conditioner, which can assuredly protect the electric actuator even when energization of the electric actuator continues for a while after arrival of the air mix door at the stop position.

It is another object of the present invention to provide a gear unit which is suitable for use in the air mix door driving mechanism.

According to a first aspect of the present invention, there is provided a driving mechanism for driving a slide type air mix door slidably installed in an automotive air conditioner. The driving mechanism comprises a rack connected to the air mix door; a gear unit including an input gear, an output gear and a flexible structure through which the input gear and the output gear are integrally and coaxially connected, the output gear being operatively meshed with the rack; and an electric actuator for driving the gear unit through the input gear, wherein the flexible structure of the gear unit comprises at least one circularly extending slit formed in a cylindrical wall portion of the output gear, and a bridge portion defined between opposed ends of the slit, by which the output gear and the input gear are integrally connected.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

For ease of understanding, the following description will proceed with the aid of several directional terms, such as, upper, lower, left, right, upward, downward and the like. However, it is to be noted that such terms are to be understood with respect to only a drawing or drawings on which corresponding part or parts are shown.

Figure 1:
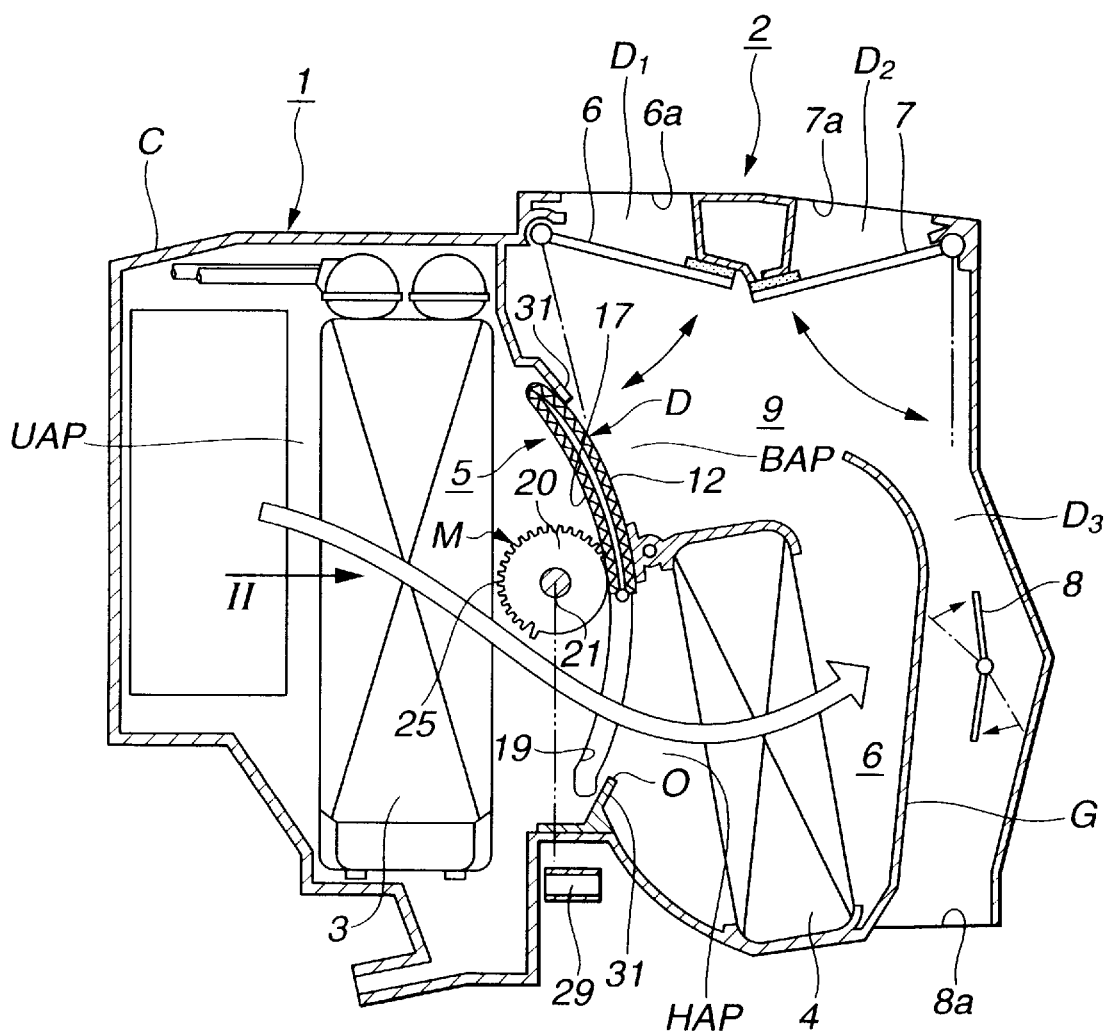
FIG. 1 is a sectional view of an automotive air conditioner to which a mix door driving mechanism of the present invention is practically applied.

Referring to FIGS. 1 to 9, particularly FIG. 1, there is shown in a sectioned manner an automotive air conditioner to which an air mix door driving mechanism M of the present invention is practically applied.

As shown, the air conditioner comprises a cooler unit 1 and a heater unit 2 which are integrated and installed in a plastic case C. When mounted in an associated motor vehicle, these two units 1 and 2 are aligned and arranged at front and rear positions with respect to a longitudinal axis of the vehicle. Due to after-mentioned unique arrangement of the two units 1 and 2, the case C has a reduced longitudinal length. The case C comprises a front-half case and a rear-half case which are coupled in a face-to-face connecting manner.

Within the case C, there are defined an upstream air flow passage UAP, a heated air flow passage HAP and a bypass air flow passage BAP. That is, the heated air flow passage HAP and the bypass air flow passage BAP are branched from a downstream end of the upstream air flow passage UAP.

Within the upstream air flow passage UAP, there is installed an evaporator 3 which is stood substantially vertically, and within the heated air flow passage HAP, there is installed a heater core 4 which is slightly inclined as shown. Due to presence of the evaporator 3, air flowing in the upstream air flow passage UAP is cooled, and due to presence of the heater core 4, air flowing in the heated air flow passage HAP is heated. Due to the standing posture taken by both the evaporator 3 and heater core 4, the distance therebetween can be reduced and thus the longitudinal length of the case C can be reduced.

At mouth portions of the bypass air flow passage BAP and heated air flow passage HAP, there is vertically arranged an air mix door D which is slid up and down. The air mix door D is of a slide type and driven by the air mix door driving mechanism M as will be described in detail hereinafter. By sliding the air mix door D, the open degree of the mouth portion of each air flow passage BAP or HAP is varied. That is, under operation, cooled air from the upstream air flow passage UAP is distributed to the two air flow passages BAP and HAP by a rate determined by the position of the air mix door D. When the air mix door D assumes its uppermost stop position as shown in FIG. 1, the bypass air flow passage BAP is fully closed and the heated air flow passage HAP is fully opened. In this case, the cooled air from the upstream air flow passage UAP is fully led to the heated air flow passage HAP and thus head.

The bypass air flow passage BAP and the heated air flow passage HAP are mated at their downstream portions to constitute an air mix chamber 9. For this mating, an air guide wall G is provided in the case C, which extends from the heated air flow passage HAP to the air mix chamber 9. Thus, cooled air from the bypass air flow passage SAP and heated air from the heated air flow passage HAP can be mixed in the air mix chamber 9 to have a certain temperature determined by the position of the air mixed door D.

From the air mix chamber 9, there extend three downstream air flow passages D1, D2 and D3 which lead to respective air blow openings 6a, 7a and 8a formed in the case C. As shown, the air guide wall G constitutes part of the third passage D3. These passages D1, D2 and D3 are respectively provided with pivotal mode doors 6, 7 and 8. Thus, temperature-conditioned air in the air mix chamber 9 can be distributed to various portions of a passenger room through selected ones of the air blow openings 6a, 7a and 8a that are opened by the corresponding mode doors 6, 7 and 8. In fact, the air blow rate at each opening 6a, 7a or 8a is varied in accordance with the open degree of the corresponding mode door 6, 7 or 8.

Figure 3:
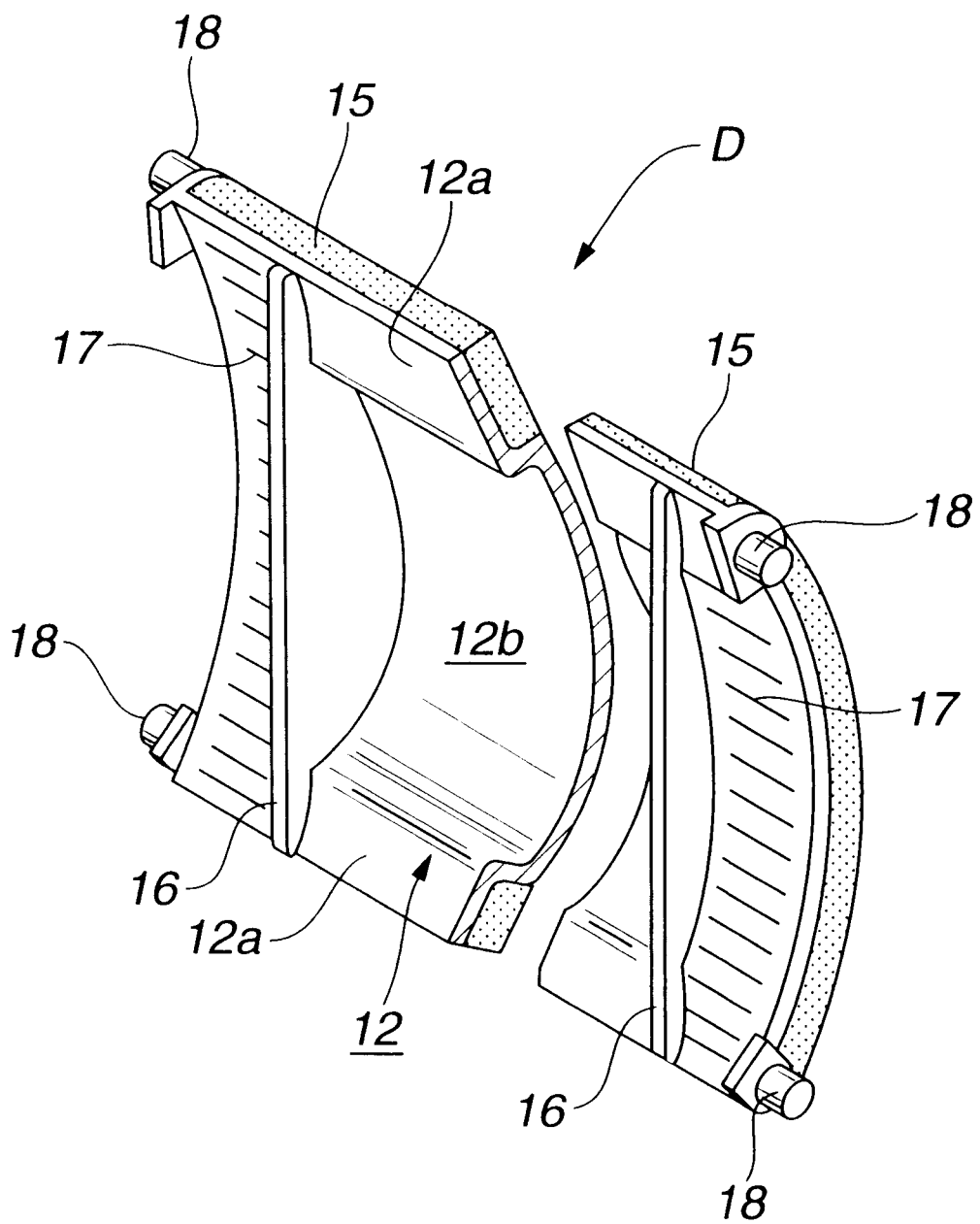
FIG. 3 is a partially cut perspective view of the slide type air mix door.

As is seen from FIG. 3, the air mix door D comprises a door proper 12 which is generally rectangular and curved in shape. As is seen from FIG. 1, the door proper 12 has a size to fully close the mouth portion of each of the bypass and heated air flow passages BAP and HAP, and the door proper 12 is so arranged that a concave inner surface thereof faces upstream, that is, toward the evaporator 3. This upstream facing arrangement brings about a smoothed air flow toward a desired passage, that is, toward the mouth portion of the bypass air flow passage BAP or that of the heated air flow passage HAP, because as is seen from FIG. 1, the concave inner surface of the door proper 12 functions to smoothly guide the cooled air toward the heated air flow passage HAP (or the bypass air flow passage BAP).

Figure 2:
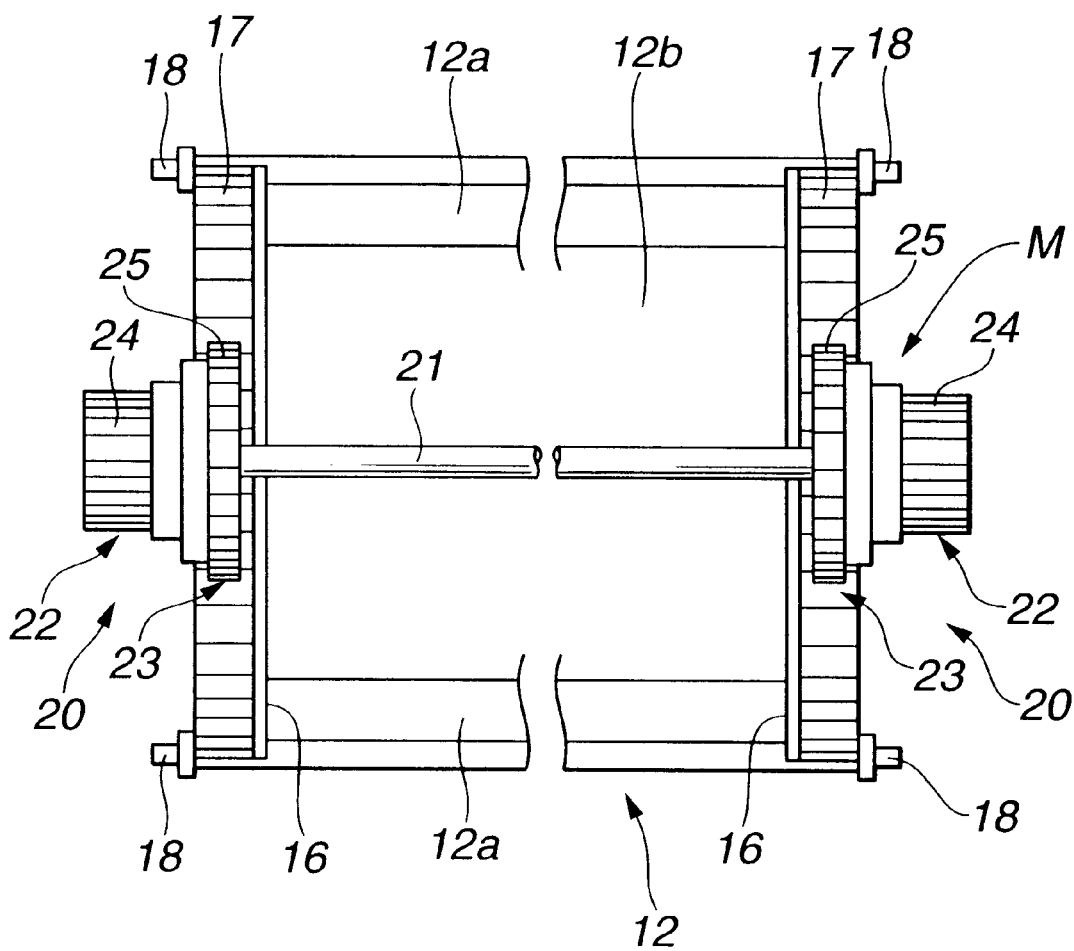
FIG. 2 is a view taken from the direction of the arrow "II" of FIG. 1, showing the air mix door driving mechanism incorporated with a slide type air mix door.

As is seen from FIGS. 2 and 3, the door proper 12 comprises upper and lower flat portions 12a and a curved middle portion 12b. A convex outer surface of the door proper 12 is lined with a sealing member 15, such as foamed polyurethane mat or the like. The door proper 12 is provided at its concave inner surface with two spaced reinforcing plates 16 for obtaining a rigid structure thereof. These reinforcing plates 16 can serve also as air guide plates.

As is best shown in FIG. 3, the door proper 12 has lateral sides which are curved like the curved middle portion 12b. Each lateral side is formed at its concave inner side with a rack 17 which includes a plurality of aligned teeth.

As is seen from FIGS. 1 and 2, upon assembly, respective gear units 20 of the air mix door driving mechanism M are operatively engaged with the racks 17 of the door proper 12 in such a manner as will be described hereinafter. Thus, upon operation of the air mix door driving mechanism M, the gear units 20 are rotated and thus the air mix door D is moved upward or downward.

For guiding the upward and downward movement of the mix door D, there is provided an air mix door guide mechanism.

As is seen from FIGS. 2 and 3, the guide mechanism comprises two pairs of guide rollers 18 which are rotatably connected to upper and lower corner portions of the lateral sides of the door proper 12. It is to be noted that each guide roller 18 rotates about an axis which is parallel with a common axis of the gear units 20. These two pairs of guide rollers 18 are respectively received in two pairs of guide grooves 19 which are provided in opposed side walls of the case C, as is understood from FIGS. 4 and 6.

Figure 6:
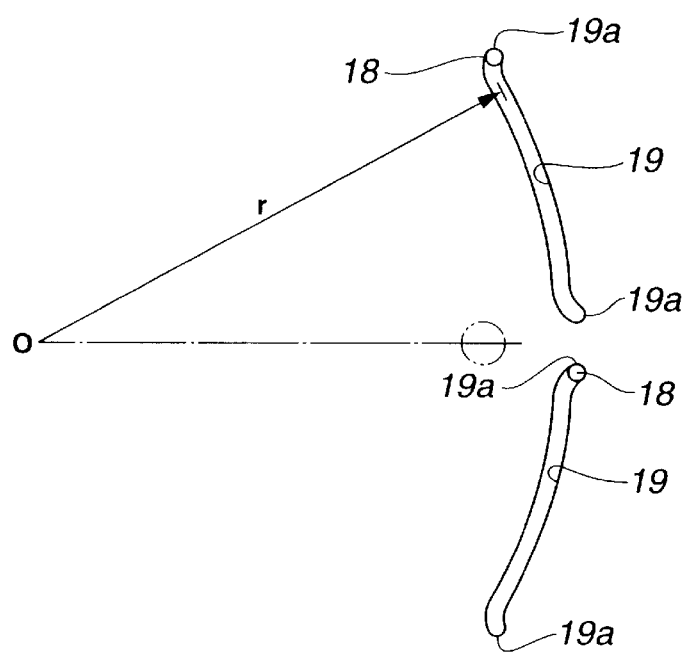
FIG. 6 is an illustration of paired guide grooves formed in each side wall of the casing.

As shown in FIG. 6, each pair of the guide grooves 19 are arranged to constitute an arc of a circle. Each guide groove 19 is in the form of a grooved cam. It is to be noted that upper two guide rollers 18 are received in the upper two guide grooves 19 and the lower two guide rollers 18 are in the lower two guide grooves 19.

The curved air mix door D is thus moved upward and downward along a given way provided by the pair of guide grooves 19 in and along which the corresponding guide rollers 18 travel. However, if desired, in place of the rotatable guide rollers 18, fixed guide pins may be used.

In the following, detail of the air mix door driving mechanism M will be described.

As has been described hereinabove, for moving the curved air mix door D along the given way determined by the two pairs of guide grooves 19, the two gear units 20 are employed. As is seen from FIGS. 2 and 4, these two gear units 20 are coaxially connected by a connecting shaft 21.

As is seen from FIG. 1, for driving the gear units 20, an electric actuator 29 is employed, which is mounted to one of the opposed side walls of the casing C. The electric actuator 29 comprises an electric motor and a speed reduction gear which are installed in a case.

Referring back to FIG. 6, each guide groove 19 has a radius of curvature "r" that is substantially equal to that of the curve of the air mix door D. As has been mentioned hereinabove, the two pairs of guide grooves 19 receive the respective guide rollers 18 of the curved air mix door D. Due to the nature of the four supporting points provided between the air mix door D and the guide grooves 19, stable supporting of the air mix door D relative to the opposed side walls of the case C is achieved and thus even when the air mix door D is attacked by a marked pressure from the flowing air, noisy vibration of the door D is suppressed.

As shown in FIG. 6, each guide groove 19 has both ends 19a which are bent obliquely rearward, that is, in a downstream direction. With these bent ends 19a, the air mix door D can be shifted rearward by a certain distance when assuming its uppermost or lowermost stop position, so that as is seen from FIGS. 1 and 4, the door D can press the sealing member 15 against partition walls 31 of the case C thereby achieving sealing therebetween. That is, when the air mix door D is brought to such a full close position for the bypass air flow passage BAP or for the heated air flow passage HAP, the closing of the passage BAP or HAP by the air mix door D is assuredly and stably made. It is to be noted that the sealing member 15 is kept away from the partition walls 31 when the air mix door D assumes intermediate positions other than the uppermost and lowermost stop positions. That is, only when sealing is really needed, the sealing member 15 is pressed against the partition walls 31, which can keep the sealing performance of the sealing member 15 for a longer time. In fact, usually, the sealing member 15 is kept away from the partition walls 31 and thus the movement of air mix door D is carried out smoothly.

Figure 8:
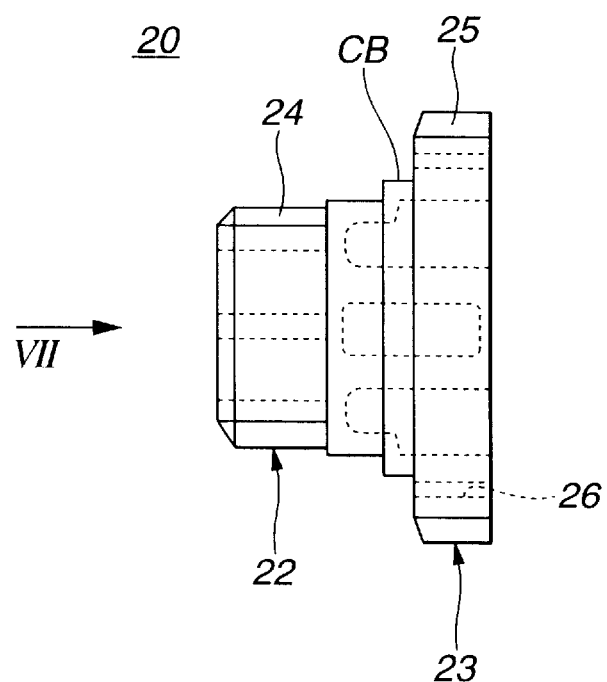
FIG. 8 is a front view of the gear unit, which is taken from the direction of the arrow VIII of FIG. 7.

As is seen from FIGS. 2 and 8, each gear unit 20 comprises a hollow input gear 22 and a hollow output gear 23 which are coaxially and integrally connected through a hollow cylindrical bearing portion CB (see FIG. 8). As will be described in detail hereinafter, within the hollow construction of the gear unit 20, there is integrally arranged a cross-shaped hub structure HS. The input gear 22 receives a power from the electric actuator 29 through a transmission member (not shown) and the output gear 23 is meshed with the corresponding rack 17 on the air mix door D. Each gear 22 and 23 has teeth 24 or 25 formed thereabout.

Figure 4:
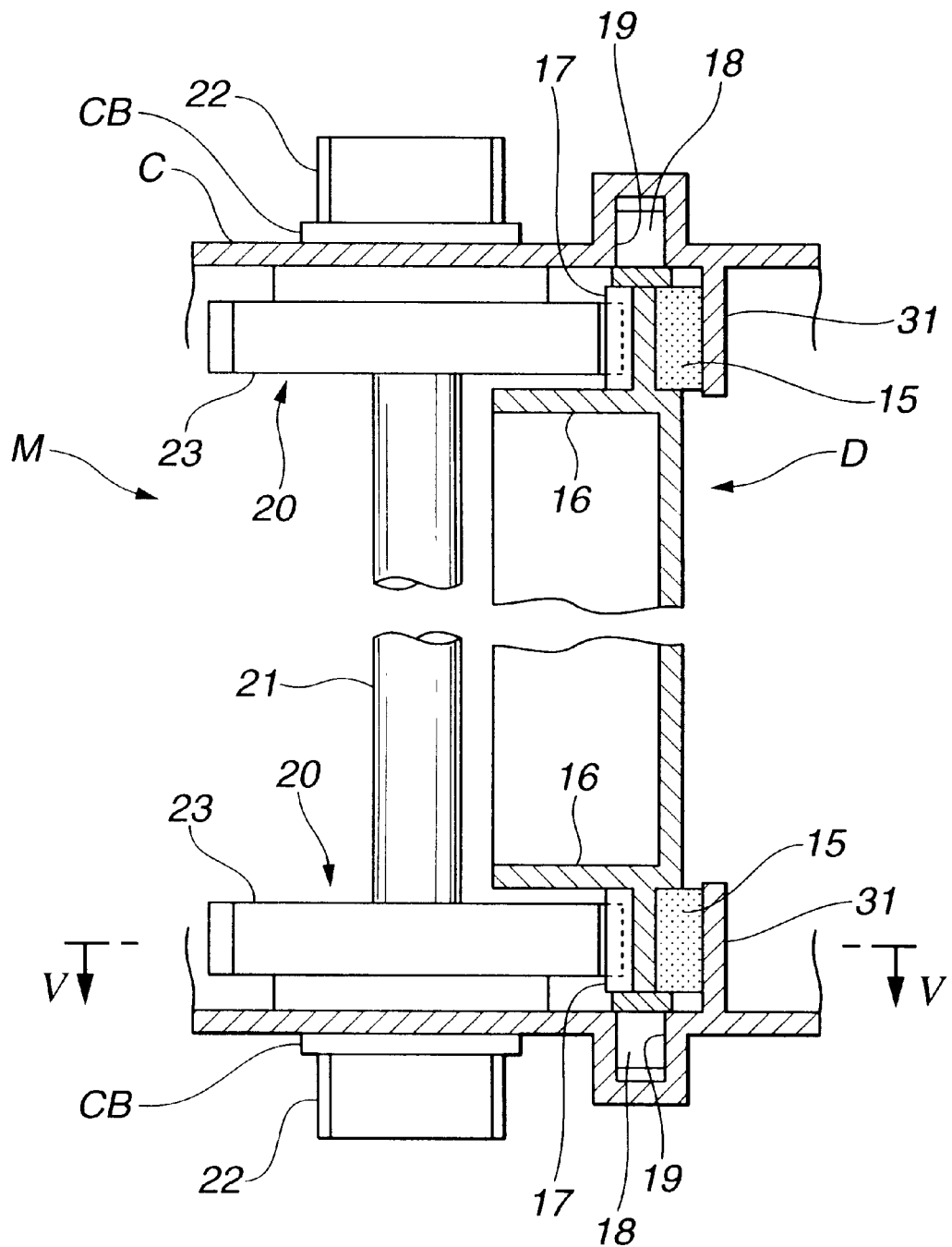
FIG. 4 is a horizontally sectional view of the air mix door driving mechanism arranged in a casing.

As is seen from FIG. 4, the cylindrical bearing portion CB of each gear unit 20 is rotatably received in an opening formed in the side wall of the casing C.

Figure 5:
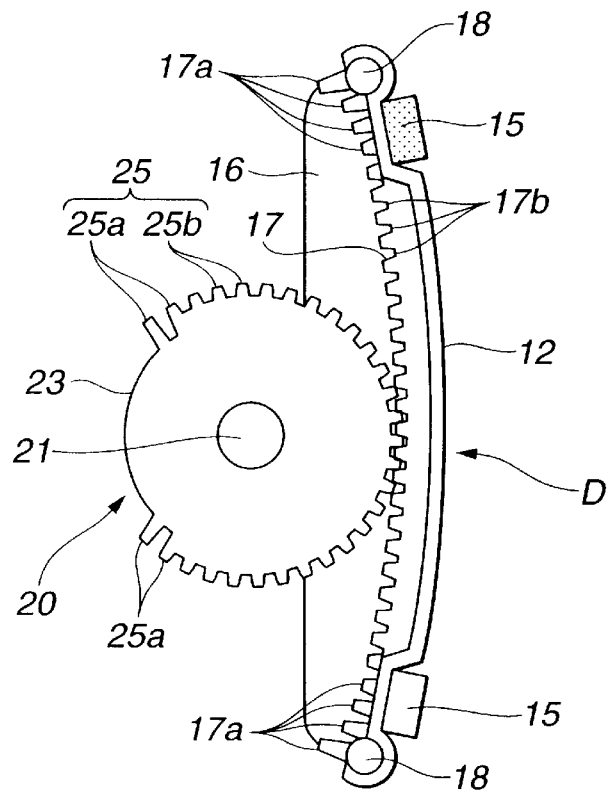
FIG. 5 is a sectional view taken along the line V—V of FIG. 4.

As is seen from FIG. 5, the teeth 25 of the output gear 23 are meshed with the teeth of the corresponding rack 17 of the mix door D. Thus, when the output gear 23 is rotated, the mix door D is slid upward and downward, as has been mentioned hereinabove. The teeth 25 of the output gear 23 comprise a row of shorter teeth 25b which are arranged on a circumferentially major portion of the gear 23 and two groups of taller teeth 25a which are arranged on circumferentially opposed end portions of the gear 23. It is to be noted that the height of the taller teeth 25a gradually increases as the position nears the terminal end. Thus, when the output gear 23 is rotated to such a terminal position that one of the two groups of taller teeth 25a becomes meshed with the teeth of the corresponding rack 17, the air mix door D is pushed rearward (viz., rightward in the drawing) by the taller teeth 25a. In the present invention, such terminal position of the output gear 23 is given when the air mix door D takes the uppermost or lowermost stop position.

As is also seen from FIG. 5, the teeth of each rack 17 comprises a row of shorter teeth 17b which are arranged on an intermediate portion of the rack 17 and two groups of taller teeth 17a which are arranged on longitudinally end portions of the rack 17. It is to be noted that the height of the taller teeth 17a gradually increases as the position nears the terminal end. In the invention, when the output gear 23 assumes the above-mentioned terminal position, the taller teeth 25a of the output gear 23 becomes meshed with the taller teeth 17a of the rack 17. With this, the meshed engagement between the output gear 23 and the rack 17 at the uppermost or lowermost stop position of the air mix door D is assuredly obtained.

Figure 7:
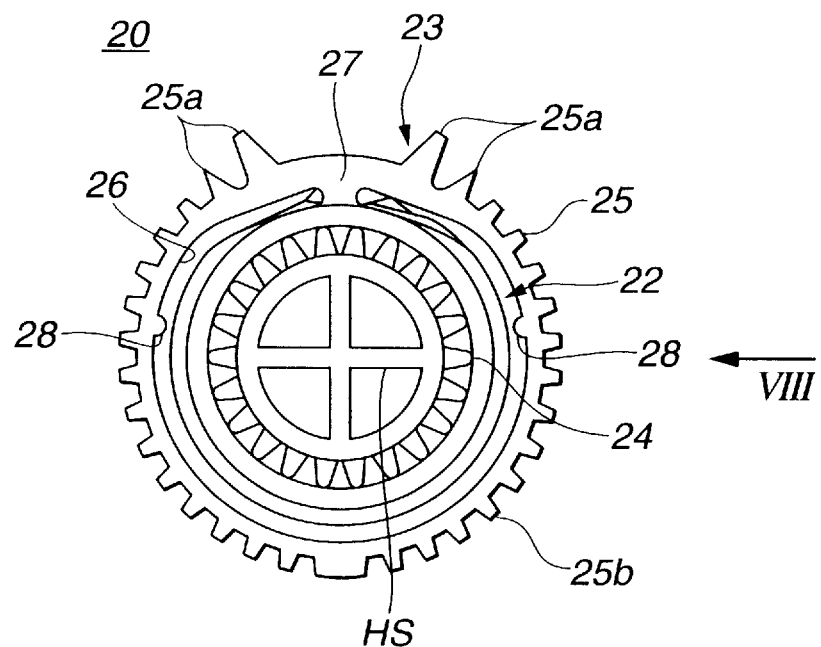
FIG. 7 is a side view of a gear unit employed in the air mix door driving mechanism of the invention, which is taken from the direction of the arrow VII of FIG. 8.

Referring to FIGS. 7 and 8, there is shown the detail of the gear unit 20.

The gear unit 20 is made of a molded plastic provided through injection molding. Polypropylene, polyacetal, Nylon (trade mark) and the like are usable as the material for the gear unit 20.

As has been mentioned herein above, the gear unit 20 comprises the hollow input gear 22 and the hollow output gear 23 which are coaxially and integrally connected through the hollow cylindrical bearing portion CB (see FIG. 8). As is seen from FIG. 7, within the hollow construction of the gear unit 20, there is coaxially and integrally arranged the hub structure HS which has a cross-shaped cross section. The hub structure HS is constructed to catch one end of the connecting shaft 21 (see FIG. 2).

As is seen from FIGS. 7 and 8, the hollow output gear 23 is formed at its cylindrical wall portion with a circularly extending slit 26. As shown in FIG. 8, the slit 26 extends throughout the thickness of the output gear 23. As shown in FIG. 7, between opposed ends of the circularly extending slit 26, there is provided a bridge portion 27 of the output gear 23 which has a certain flexibility due to its narrower shape.

It is now to be noted that due to provision of the slit 26 and the flexible bridge portion 27, the output gear 23 can have a flexibility relative to the hub structure HS, that is, relative to the input gear 22. More specifically, flection of the output gear 23 is carried out mainly at the flexible bridge portion 27. Thus, when, with the air mix door D kept stopped, the input gear 22 is applied with a certain driving force from the electric actuator 29, initial rotation of the input gear 22 brings about a certain flection of the output gear 23 at the bridge portion 27.

As is seen from FIG. 7, the bridge portion 27 is positioned near the taller teeth 25a of the output gear 23, more specifically between the opposed two of the taller teeth 25a. With this arrangement, the bridge portion 27 has a sufficient thickness in radial direction since the portion between the opposed two of the taller teeth 25a is free of the teeth 25. Of course, the bridge portion 27 may be provided at other positions, such as a position near the shorter teeth 25b. Furthermore, as will be described in detail hereinafter, many bridge portions may be provided for the flexible but assured connection between the output gear 23 and the input gear 22.

As is seen from FIG. 7, the output gear 23 may have two small projections 28 projected into the circularly extending slit 26. In the illustrated embodiment, these projections 28 are formed on an outside surface of the slit 26. Upon flection of the output gear 23, each projection 28 is brought into abutment with an inside surface of the slit 26 controlling the flexibility of the output gear 23 relative to the input gear 22. By changing the size and position of the projections 28, the flexibility of the output gear 23 is varied. Of course, if desired, the projections 28 may be formed on the inside surface of the slit 26.

In the following, operation of the air mix door driving mechanism M of the present invention will be described with reference to the drawings.

For ease of understanding, description will be commenced with respect to the condition as shown in FIG. 1.

In this condition, the air mix door D fully closes the bypass air flow passage BAP while fully opening the heated air flow passage HAP. The upper side guide rollers 18 of the mix door D are received in the upper bent ends 19a of the upper side guide grooves 19, and the lower side guide rollers 18 of the mix door D are received in the upper bent ends 19a of the lower side guide grooves 19. Furthermore, the taller teeth 25a at one end part of each output gear 23 engage with the lower-side taller teeth 17a of the corresponding rack 17 of the air mix door D. Thus, the air mix door D is kept biased rightward in the drawing pressing the sealing member 15 against the partition walls 31. Under this condition, cooled air from the upstream air flow passage UAP enters only the heated air flow passage HAP, as is indicated by a curved thick arrow.

When now the electric actuator 29 is energized to run in a given direction, each gear unit 20 rotates clockwise in FIG. 1. With this, the curved air mix door D is slid downward along the given way provided by the pair of guide grooves 19, as has been described hereinabove.

When the air mix door D comes to the lowermost stop position, a position sensor stops the energization of the electric actuator 29. At this lowermost stop position of the air mix door D, the bypass air flow passage BAP becomes fully opened and the heated air flow passage HAP becomes fully closed.

Figure 9:
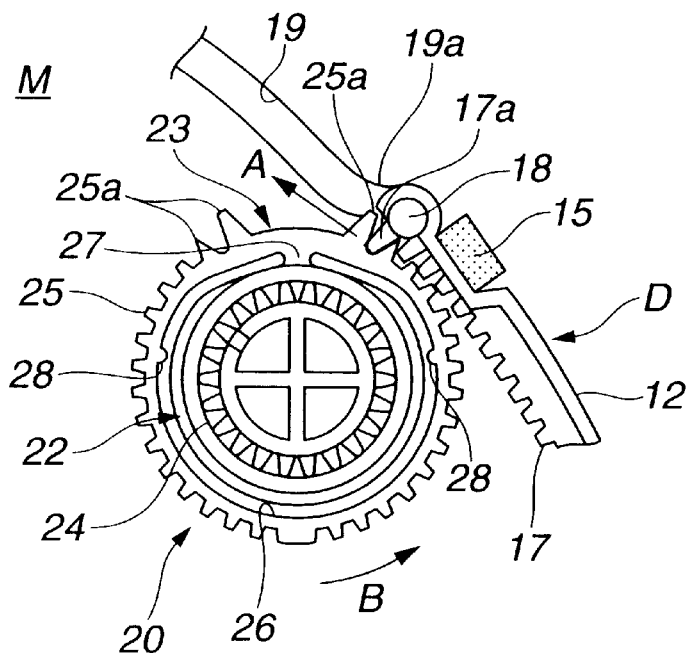
FIG. 9 is an illustration showing an advantageous operation of the air mix door driving mechanism of the present invention.

In this case, the air mix door driving mechanism M assumes the condition as shown in FIG. 9. That is, the upper side guide rollers 18 of the door D are received in the lower bent ends 19a of the upper side guide grooves 19, and the lower side guide rollers 18 of the door D are received in the lower bent ends 19a of the lower side guide grooves 19. Furthermore, the taller teeth 25a at the other end part of the output gear 23 engage with the higher-side taller teeth 17a of the rack 17 of the mix door D. Thus, the air mix door D is biased rightward in FIG. 9 pressing the sealing member 15 against the partition walls 31. Under this condition, cooled air from the upstream air flow passage UAP enters only the bypass air flow passage BAP. That is, in this case, a so-called "full cool mode" is established by the air conditioner.

In the following, advantageous operation of the air mix door driving mechanism M will be described with reference to FIG. 9.

If, due to inevitable dimensional deviation of parts of the mechanism M, stopping of the electric actuator 29 is not exactly timed with arrival of the mix door D at the lowermost stop position, that is to say, if the stopping of the electric actuator 29 takes place a little after the air mix door D arrives at the lowermost stop position, the right side taller teeth 25a of the output gear 23 (as viewed in the drawing) meshed with the upper side taller teeth 17a of the rack 17 are applied with a certain counterforce in the direction of the arrow A. However, in this case, due to function of the flexible bridge portion 27, the counterforce applied to the taller teeth 17a brings about a little but certain pivoting of the output gear 23 in the direction of the arrow B about the bridge portion 27 until the projections 28 of the slit 26 are brought into abutment with the inside surface of the slit 26. That is, upon such ill-timed case, the output gear 23 effects a return back movement relative to the input gear 22. This return back phenomenon is quite advantageous because the electric actuator 29 is prevented from being attacked by an excessive load. That is, such phenomenon can compensate the inevitable dimensional deviation of various parts of the mechanism M and thus smoothly absorb shocks applied to the taller teeth 25a of the output gear 23 and to the taller teeth 17a of the rack 17.

The flexibility of the output gear 23 relative to the input gear 22 is easily changed by varying the size and shape of the slit 26, the bridge portion 27 and the projections 28.

Figure 10:
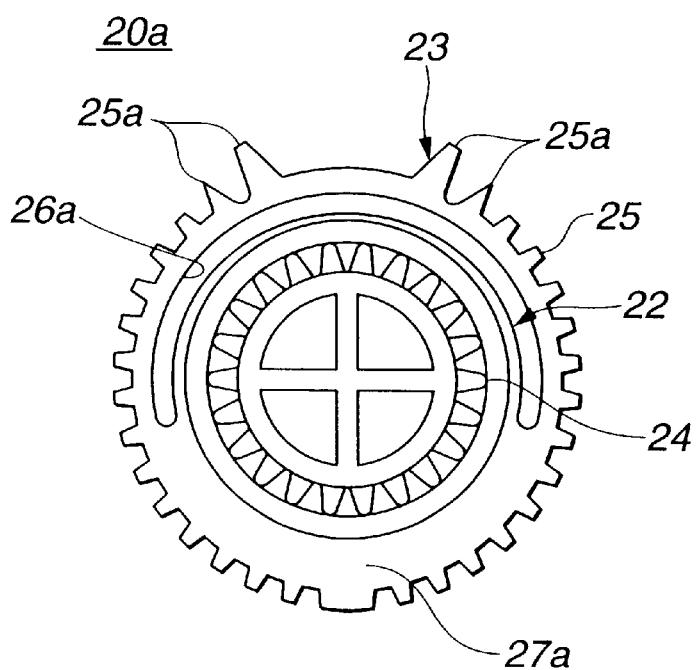
FIGS. 10, 11 and 12 are views similar to FIG. 7, but showing first, second and third modified gear units employable in the air mix door driving mechanism of the invention.

Referring to FIG. 10, there is shown a first modified gear unit 20a which is employable in the mix door driving mechanism of the present invention.

As shown, in this modification 20a, the circularly extending slit 26a extends around an upper part of the output gear 23 where the right-side and left-side taller teeth 25a of the gear 23 are provided. In this modification, the central angle defined between opposed ends of the slit 26a is about 180°±45°, and preferably, about 180° to about 210°. Thus, a broader bridge portion 27a is defined at a lower part of the output gear 23. In other words, in this first modification 20a, a narrow bridge portion is not provided.

If, due to ill-timing between the stopping of the electric actuator 29 and the arrival of the mix door D at the terminal stop position, the right side taller teeth 25a of the output gear 23 (as viewed in the drawing) are applied with a certain counterforce like in the above-mentioned manner as shown in FIG. 9, the output gear 23 is slightly but certainly flexed in the same direction due to deformation of the upper part of the same. Thus, substantially same advantages are equally obtained in the driving mechanism M employing this first modified gear unit 20a.

Figure 11:
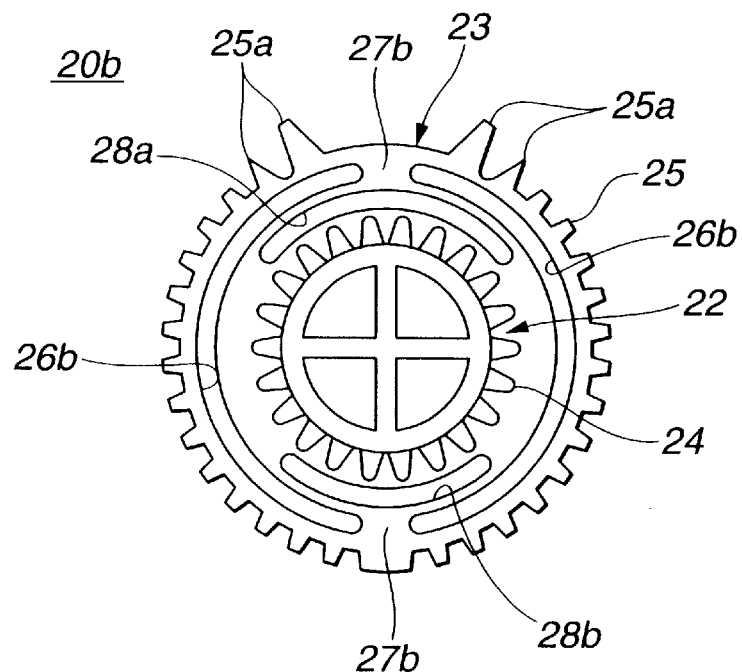

Referring to FIG. 11, there is shown a second modified gear unit 20b which is also employable in the air mix door driving mechanism of the present invention.

As shown, in this second modification 20b, two semi-circular slits 26b are symmetrically provided in the output gear 23 leaving upper and lower narrower bridge portions 27b between mutually facing ends of the slits 26b. In this modification, the upper bridge portion 27b is located near the right side and left side taller teeth 25a and the lower bridge portion 27b is located at a diametrically opposed position of the upper bridge portion 27b. Furthermore, the output gear 23 is formed, inside the semi-circular slits 26b, with two shorter arcuate slits 28a and 28b each extending by the upper or lower bridge portion 27b as shown. As shown, the shorter arcuate slits 28a and 28b are located at diametrically opposed portions of the output gear 23. Preferably, the center angle defined between opposed ends of each shorter arcuate slit 28a or 28b is smaller than 90°. In the illustrated modification, the upper arcuate slit 28a is longer than the lower one 28b. Thus, in this second modification 20b, two narrower bridge portions 27b are provided.

For the same reason as mentioned in the above-mentioned first modification 20a, the output gear 23 can be flexed relative to the input gear 22 when being applied with a certain counterforce through the taller teeth 25a.

Figure 12:
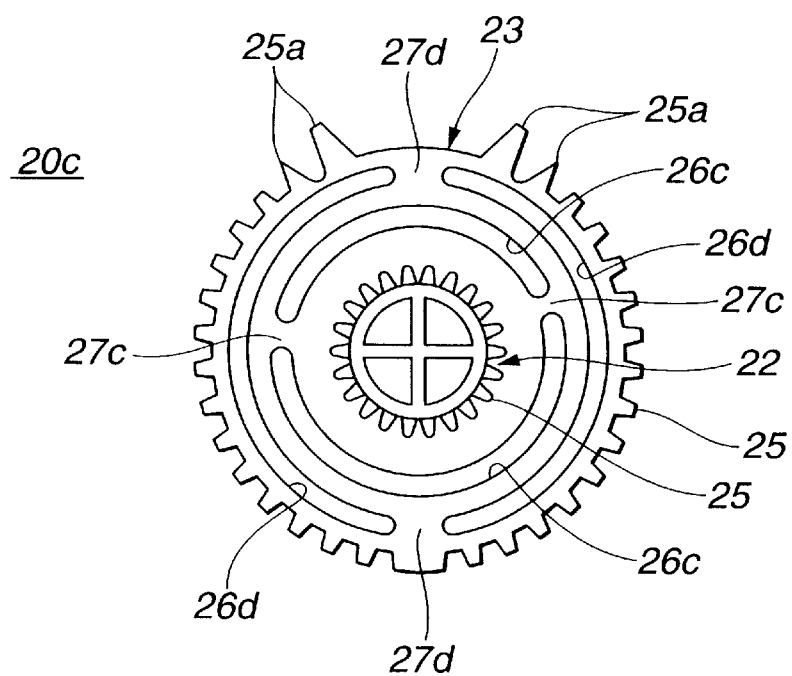

Referring to FIG. 12, there is shown a third modified gear unit 20c which is also employable in the mix door driving mechanism of the present invention.

As shown, in this third modification 20c, similar to the above-mentioned second modification 20b, two semi-circular slits 26d are symmetrically provided in the output gear 23 leaving upper and lower narrower bridge portions 27d between mutually facing ends of the slits 26d. Furthermore, similar to the second modification 20b, inside the semi-circular slits 26d, there are provided two arcuate slits 26c each extending by the upper or lower bridge portion 27d as shown. In this third modification 20c, the arcuate slits 26c are sufficiently long to define two narrower bridge portions 27c between mutually facing ends of the arcuate slits 26c. Thus, in this third modification 20c, four narrower bridge portions 27d and 27c are provided.

Thus, for the same reason as mentioned hereinabove, the output gear 23 can be flexed relative to the input gear 22 when receiving a certain counterforce through the taller teeth 25a.

The entire contents of Japanese Patent Applications P11-105638 (filed Apr. 13, 1999) and P11-352338 (filed Dec. 10, 1999) are incorporated herein by reference.

Although the invention has been described above with reference to a certain embodiment of the invention, the invention is not limited to such embodiment. Various modifications and variations of the embodiment will occur to those skilled in the art, in light of the above teachings.

What is claimed is:

1. A driving mechanism for driving an air mix door slidably installed in an automotive air conditioner, comprising:
    a rack provided by said air mix door;
    a gear unit including an input gear, an output gear and a flexible structure through which said input gear and said output gear are integrally and coaxially connected, said output gear being operatively meshed with said rack; and
    an electric actuator for driving said gear unit through said input gear,
    wherein said flexible structure of said gear unit comprises at least one circularly extending slit formed in a cylindrical wall portion of said output gear.

2. A driving mechanism as claimed in claim 1, in which said flexible structure of said gear unit further comprises a bridge portion defined between opposed ends of said slit, by which said output gear and said input gear are integrally connected.

3. A driving mechanism as claimed in claim 2, in which said flexible structure of said gear unit further comprises at least one projection projected into said slit from one inner surface of the slit.

4. A driving mechanism as claimed in claim 2, in which said output gear comprises a row of shorter teeth which are arranged on a circumferentially major portion of said output gear and two groups of taller teeth which are arranged on circumferentially opposed ends of said row of shorter teeth.

5. A driving mechanism as claimed in claim 4, in which said rack comprises a row of shorter teeth which are arranged on a major portion of said rack and two groups of taller teeth which are arranged on longitudinally opposed ends of the row of shorter teeth.

6. A driving mechanism as claimed in claims 4, in which said two groups of taller teeth are located in the vicinity of said bridge portion.

7. A driving mechanism as claimed in claim 4, in which said two groups of taller teeth are located at a portion diametrically opposite to said bridge portion.

8. A driving mechanism as claimed in claim 7, in which said two groups of taller teeth are located in the vicinity of a generally middle portion of said slit.

9. A driving mechanism as claimed in claim 1, in which said circularly extending slit comprises:
    two semi-circular slit sections symmetrically provided;
    two bridge portions, each being defined between mutually facing ends of the two semi-circular slit sections and integrally connecting said input and output gears; and
    two arcuate slit sections provided inside said semi-circular slit sections at diametrically opposed portions of said output gear.

10. A driving mechanism as claimed in claim 9, in which one of said bridge portions is located in the vicinity of the two groups of taller teeth.

11. A driving mechanism as claimed in claim 10, in which an imaginary line passing through said two bridge portions passes through generally middle portions of said two arcuate slit sections.

12. A driving mechanism as claimed in claim 11, further comprising third and fourth bridge portions, each being defined between mutually facing ends of said two arcuate slit sections.

13. A driving mechanism as claimed in claim 1, in which said rack is a curved rack, and said air mix door is curved, said curved rack being integrally formed on said curved air mix door.

14. A driving mechanism as claimed in claim 13, in which said air mix door is arranged to move along a curved traveling path provided by a mix door guide mechanism.

15. A driving mechanism as claimed in claim 14, in which said air mix door guide mechanism comprises:
    two pairs of guide grooves, which are provided in opposed side walls of a case of said air conditioner; and
    two pairs of guide rollers rotatably connected to opposed side ends of said air mix door, said guide rollers being operatively engaged with said guide grooves respectively.

16. A gear unit constructed of a plastic, comprising:

an input gear;

an output gear; and a flexible structure through which said input and output gears are coaxially and integrally connected, said flexible structure including (i) at least one circularly extending slit formed in a cylindrical wall portion of said output gear and (ii) a bridge portion defined between opposed ends of said circularly extending slit, by which said output and input gears are integrally connected.

17. A gear unit as claimed in claim 16, in which a plurality of arcuate slits are formed around and in the cylindrical wall of said output gear.

18. A gear unit as claimed in claim 17, in which said arcuate slits are mutually concentrically formed in the cylindrical wall of said output gear.

19. A gear unit as claimed in claim 17, in which a plurality of bridge portions are provided, each being defined between mutually facing ends of paired two of the arcuate slits and integrally connecting said output and input gears.

20. A gear unit as claimed in claim 16, in which said output gear comprises:

a row of shorter teeth circumferentially arranged on said cylindrical wall; and two groups of taller teeth which are respectively arranged on opposed ends of the row of shorter teeth.

* * * * *